United States Patent
Roques et al.

(10) Patent No.: US 10,266,254 B2
(45) Date of Patent: Apr. 23, 2019

(54) AIRCRAFT LANDING GEAR

(71) Applicants: Safran Electronics & Defense, Boulogne-Billancourt (FR); Safran Electrical & Power, Blagnac (FR)

(72) Inventors: Serge Roques, Blagnac (FR); Francois Guillot, Boulogne-Billancourt (FR)

(73) Assignees: SAFRAN ELECTRONICS & DEFENSE, Boulogne-Billancourt (FR); SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/737,256

(22) PCT Filed: Jun. 16, 2016

(86) PCT No.: PCT/EP2016/063843
§ 371 (c)(1),
(2) Date: Dec. 15, 2017

(87) PCT Pub. No.: WO2016/202908
PCT Pub. Date: Dec. 22, 2016

(65) Prior Publication Data
US 2018/0170528 A1 Jun. 21, 2018

(30) Foreign Application Priority Data
Jun. 16, 2015 (FR) ...................... 15 55510

(51) Int. Cl.
*B64C 25/40* (2006.01)
*B64C 25/24* (2006.01)
(Continued)

(52) U.S. Cl.
CPC .............. *B64C 25/24* (2013.01); *B64C 25/34* (2013.01); *B64C 25/405* (2013.01); *B64C 25/42* (2013.01);
(Continued)

(58) Field of Classification Search
CPC ........ B64C 25/24; B64C 25/42; B64C 25/405
See application file for complete search history.

(56) References Cited

U.S. PATENT DOCUMENTS 9,211,948 B2 * 12/2015 Osman ................... B64C 25/405
9,522,728 B2 * 12/2016 Cox ....................... B64C 25/405
(Continued)

FOREIGN PATENT DOCUMENTS

| EP | 2783980 | 10/2014 |
|---|---|---|
| FR | 2899871 | 10/2007 |
| FR | 2939099 | 6/2010 |

OTHER PUBLICATIONS

"French Preliminary Search Report," FR Application No. 1555510 (dated May 9, 2016) (with English translation cover sheet).
(Continued)

*Primary Examiner* — Timothy D Collins
*Assistant Examiner* — Tye William Abell
(74) *Attorney, Agent, or Firm* — Womble Bond Dickinson (US) LLP

(57) ABSTRACT

The invention relates to an aircraft landing gear (2) comprising:—a leg (6) having a first leg portion (8) that can be pivotably connected to a load-bearing structure of the aircraft (1) in order for the landing gear (2) to be deployed and retracted, and a second leg portion (9) that is rotatable in relation to the first leg portion (8);—a wheel (13, 14) that is rotatable in relation to the second leg portion (9), and an electric motor (15, 16) that can rotate the wheel (13, 14) in relation to the second leg portion (9);—a transmission mechanism (17) designed to selectively transmit torque generated by the electric motor (15, 16) to the wheel (13, 14) in order to rotate the wheel in relation to the second leg portion (9) or to the second leg portion (9) in order to rotate the second leg portion (9) in relation to the first leg portion (8).

13 Claims, 3 Drawing Sheets

Figure 1A:
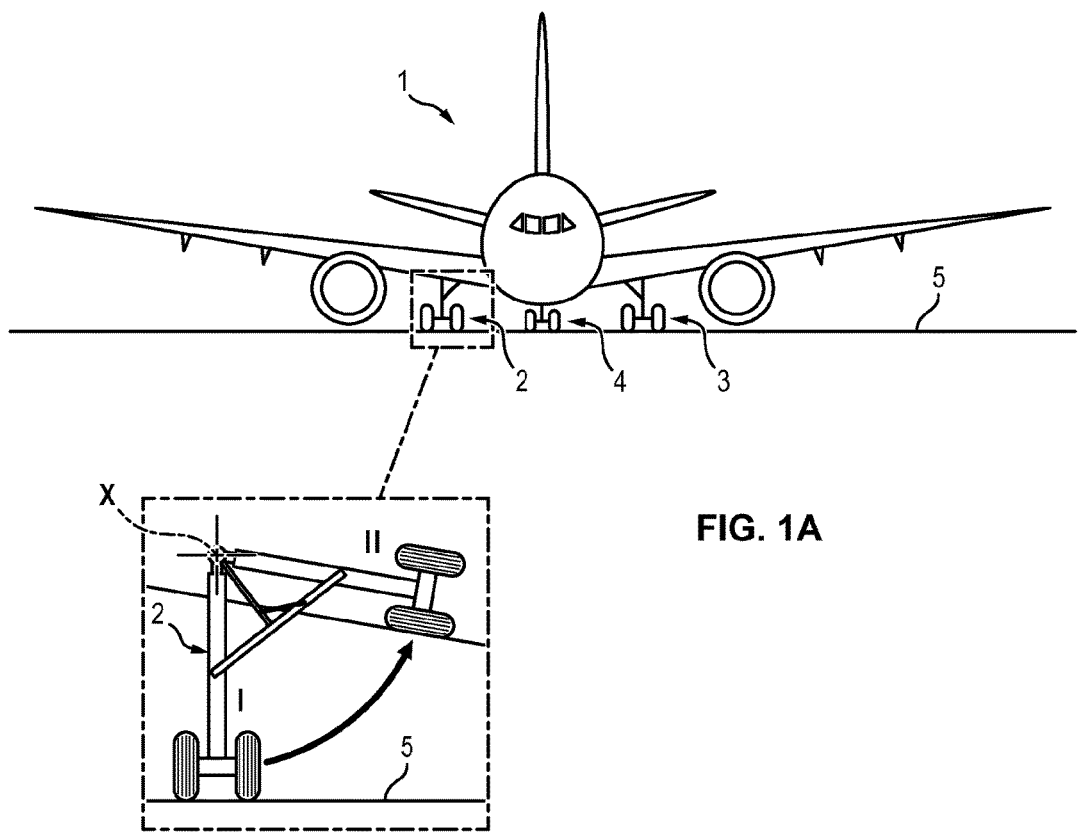

(51) Int. Cl.
*B64C 25/50* (2006.01)
*B64C 39/02* (2006.01)
*B64C 25/34* (2006.01)
*B64C 25/42* (2006.01)

(52) U.S. Cl.
CPC ............ *B64C 25/50* (2013.01); *B64C 39/024* (2013.01); *Y02T 50/823* (2013.01)

(56) References Cited

U.S. PATENT DOCUMENTS

| | | | |
|---|---|---|---|
| 2010/0147995 A1* | 6/2010 | Cros ................ | B64C 25/405 |
| | | | 244/50 |
| 2011/0233328 A1* | 9/2011 | Alleau ............... | B64C 25/24 |
| | | | 244/102 R |
| 2013/0200210 A1* | 8/2013 | Oswald .............. | B64C 25/405 |
| | | | 244/50 |
| 2014/0225421 A1 | 8/2014 | Oswald et al. | |
| 2014/0263832 A1* | 9/2014 | Schmidt ............. | B64C 25/12 |
| | | | 244/102 A |
| 2015/0291278 A1* | 10/2015 | Allwein ............. | B64C 25/24 |
| | | | 244/102 A |
| 2016/0221669 A1* | 8/2016 | Didey ................ | B64C 25/405 |

OTHER PUBLICATIONS

"International Search Report," PCT Application No. PCT/EP2016/063843 (dated Aug. 26, 2016) (with English translation cover sheet).

* cited by examiner

US 10,266,254 B2

AIRCRAFT LANDING GEAR

FIELD OF THE INVENTION

The invention relates to landing gear for aircraft.

STATE OF THE ART

Most aircraft are equipped with undercarriages or landing gears enabling the aircraft to travel on the ground during takeoff, landing and taxiing phases. These landing gears comprise several wheels which may be arranged according to configurations varying from one aircraft to the other.

Some landing gears may be retracted inside the wings or the fuselage of the aircraft to decrease resistance to air of the aircraft during flight phases.

For this purpose, landing gears are equipped with mechanical rod and rail systems activated via hydraulic actuators to cause the landing gear to pivot for deploying and retracting it. An advantage of hydraulic actuators is that they generally lightweight. But a disadvantage of these actuators is that they need hydraulic fluid supply.

To avoid the use of hydraulic fluid, it would be possible to replace the hydraulic actuators by electrical actuators. Yet, at equal power, electrical actuators are generally heavier than hydraulic actuators.

Also, currently, aircraft are generally moved on the ground by means of their reactors during taxiing phases.

Solutions are currently being developed for moving aircraft without using the power of reactors.

One developed solution consists of motorizing some of the wheels of the main trains of aircraft by using the electrical power produced by the auxiliary power unit (APU). Electric motors cause the wheels to turn at different speeds, which lends the aircraft more maneuverability on the ground by improving the steering of the plane.

Motorizing the wheels further lets the pilot move out of parking areas without waiting for a towing vehicle to take over the aircraft.

Finally, the use of electrical power provided by the APU significantly improves operating costs and produces an environmental benefit by lowering the consumption of fuel and limiting noise around terminals.

SUMMARY OF THE INVENTION

An aim of the invention is to propose a solution for avoiding the use of hydraulic actuators for deployment and retraction of landing gears.

This aim is achieved within the scope of the present invention by way of a landing gear for an aircraft comprising:
- a leg having a longitudinal axis and comprising a first leg part suitable for being articulated on a bearing structure of the aircraft for deployment and retraction of the landing gear, and a second leg part rotatably mounted relative to the first leg part along the longitudinal axis of the leg,
- a wheel movably mounted in rotation relative to the second leg part and an electric motor suitable for driving the wheel in rotation relative to the second leg part,
- a transmission mechanism configured to transmit torque generated by the electric motor selectively to the wheel to drive the wheel in rotation relative to the second leg part, or to the second leg part to drive the second leg part in rotation relative to the first leg part along the longitudinal axis of the leg.

In such landing gear, the electric motor serves both for driving or braking the wheel during rolling phases, and for the orientation of the second leg part. In other words, the invention takes advantage of the presence of an electric motor to allow a modification of the orientation of the second leg part relative to the first leg part.

On the one hand, the modification of the orientation of the second leg part relative to the first leg part may allow an orientation of the wheels to direct the aircraft on the ground during taxiing and parking phases.

On the other hand, the second leg part may comprise a wing shaped faired portion. The rotation of the second leg part relative to the first leg part thus enables adjustment of the orientation of the faired portion to produce a lift force acting on the faired portion, for facilitating retraction of the landing gear.

The landing gear may further have the following features:
- the transmission mechanism comprises a transmission shaft, having a first end suitable for being coupled to the motor and a second end suitable for being immobilized relative to the first leg part to drive the second leg part in rotation relative to the first leg part,
- the transmission shaft extends inside the leg,
- the transmission shaft is rotatably mounted relative to the second leg part about the longitudinal axis of the leg,
- the landing gear further comprises a brake arranged between the first leg part and the second end of the transmission shaft, the brake being movable between an engaged configuration in which the brake prevents rotation of the transmission shaft relative to the first leg part, and a disengaged configuration in which the brake enables rotation of the transmission shaft relative to the first leg part,
- the landing gear comprises a toothed wheel fixedly mounted on the second end of the transmission shaft, the toothed wheel being suitable for meshing with a toothed circular track fixedly mounted on the bearing structure of the aircraft, such that rotation of the transmission shaft relative to the first leg part causes rotation of the landing gear relative to the support structure of the aircraft,
- the transmission mechanism comprises a reduction gear having an input, a first output and a second output, the input being connected to the electric motor, the first output being connected to the wheel so that the motor may drive the wheel by means of the reduction gear, and the second output being connected to the transmission shaft so that the electric motor may drive the transmission shaft in rotation relative to the second leg part by means of the reduction gear,
- the landing gear further comprises a brake arranged between the first leg part and the second leg part, the brake being movable between an engaged configuration in which the brake prevents rotation of the second leg part relative to the first leg part, and a disengaged configuration in which the brake enables rotation of the second leg part relative to the first leg part,
- the landing gear comprises a brake arranged between the second leg part and the wheel, the brake being movable between an engaged configuration in which the brake prevents rotation of the wheel relative to the second leg part, and a disengaged configuration in which the brake enables rotation of the wheel relative to the second leg part, the landing gear comprises a couple of wheels, comprising a first wheel and a second wheel, and a couple of electric motors, comprising a first electric motor and a second electric motor suitable for driving respectively the first wheel and the second wheel in rotation relative to the second leg part, to enable rolling of the aircraft, the transmission mechanism comprises:

a transmission shaft, the transmission shaft being rotatably mounted relative to the second leg part about the longitudinal axis of the leg, and a first reduction gear comprising an input connected to the first electric motor and an output connected to the transmission shaft, and a second reduction gear comprising an input connected to the second electric motor and an output connected to the transmission shaft, the first reduction gear and the second reduction gear forming a differential suitable for driving the transmission shaft in rotation when the first electric motor and the second electric motor turn at different speeds, the landing gear comprises a first brake arranged between the second leg part and the first wheel and a second brake arranged between the second leg part and the second wheel, each brake being movable between an engaged configuration in which the brake prevents rotation of the wheel relative to the second leg part and a disengaged position in which the brake prevents rotation of the wheel relative to the second leg part.

PRESENTATION OF THE DRAWINGS

Figure 1B:
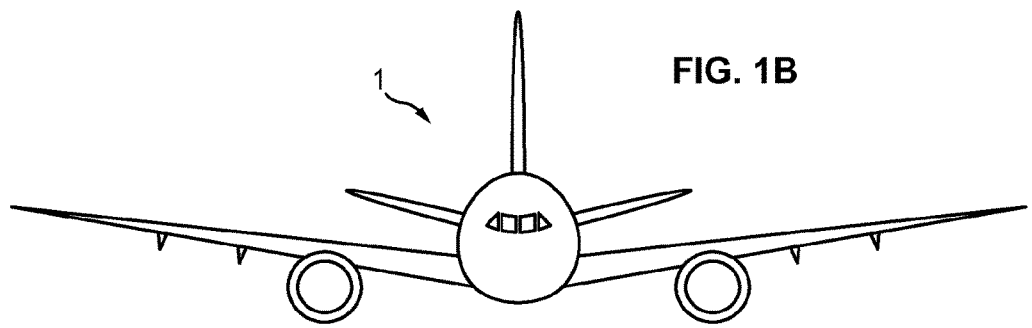
Figure 2:
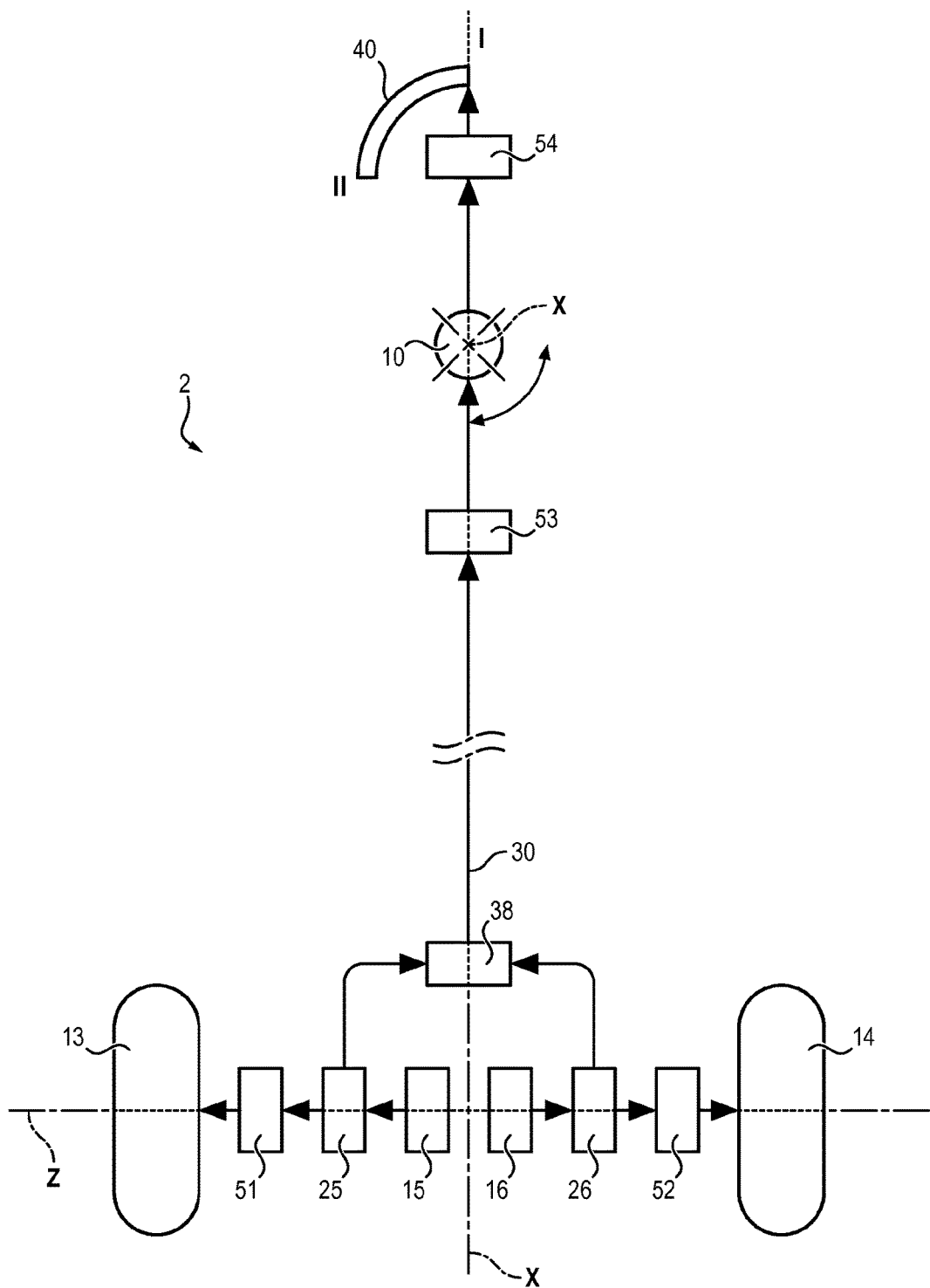
Figure 3:
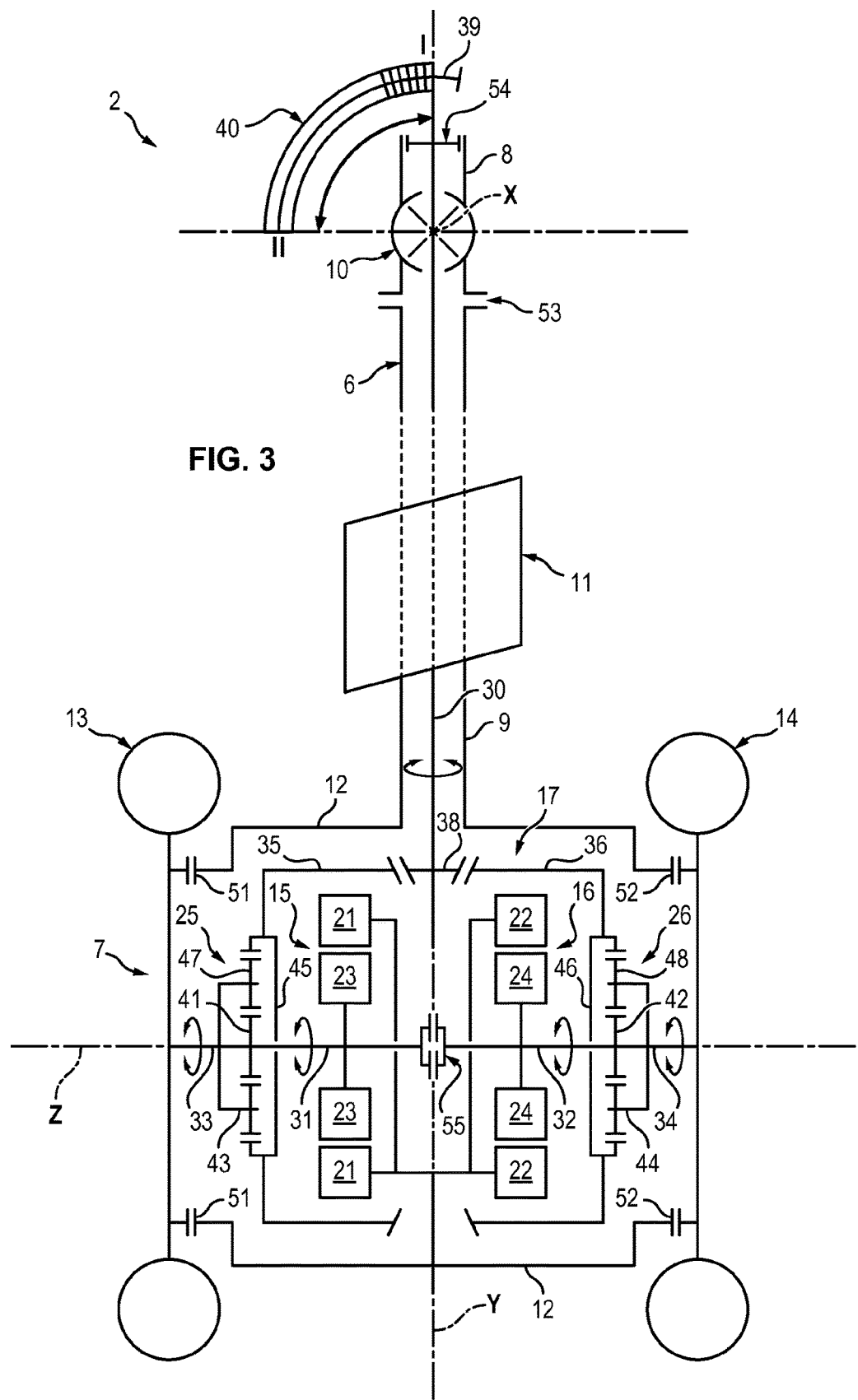

Other features and advantages will emerge from the following description which is purely illustrative and non-limiting, and must be considered in conjunction with the appended figures, in which:

FIGS. 1A and 1B schematically illustrate an aircraft comprising landing gears in deployed position and in retracted position, respectively, FIG. 2 schematically illustrates the principle of landing gear according to an embodiment of the invention, FIG. 3 schematically illustrates the structure of landing gear according to an embodiment of the invention.

DETAILED DESCRIPTION OF AN EMBODIMENT

In FIGS. 1A and 1B, the aircraft 1 shown comprises two main landing gears 2 and 3 and a front landing gear 4. The two main landing gears 2 and 3 are located under the wings of the aircraft 1. Each main landing gear 2, 3 is pivotally mounted relative to the support structure of the aircraft 1, about an axis of rotation X substantially parallel to the longitudinal axis of the aircraft 1. Each landing gear 2, 3 is pivotally mounted between a deployed position (position I) and a retracted position (position II).

In the deployed position (FIG. 1A), each landing gear 2, 3 extends outside the wing such that the wheels of the landing gear may be in contact with the ground 5 for evolution of the aircraft 1 during takeoff, landing and taxiing phases.

In the retracted position (FIG. 1B), each landing gear 2, 3 is returned inside the wing to lower resistance to air of the aircraft 1. The landing gears 2, 3 are housed in landing gear boxes located in each wing.

In FIGS. 2 and 3, the landing gear 2 shown comprises a leg 6 and a wheel train 7, the wheel train 7 being connected to the support structure of the aircraft 1 by means of the leg 6.

The leg 6 has a longitudinal axis Y. The leg 6 comprises a first leg part 8 (or upper leg part) and a second leg part 9 (or lower leg part). The first leg part 8 is rotatably mounted on the support structure of the aircraft about the axis X by means of an articulation 10 for deployment and retraction of the landing gear 2. The second leg part 9 is rotatably mounted relative to the first leg part 8 along the longitudinal axis Y of the leg 6. Also, the second leg part 9 comprises a wing-shaped faired portion 11.

The wheel train 7 comprises a casing 12, a first wheel 13 (or right wheel) and a second wheel 14 (or left wheel), both rotatably mounted on the casing 12, about a common axis of rotation Z.

The casing 12 of the wheel train 7 is fixedly mounted on the second leg part 9.

The landing gear 2 further comprises a first electric motor 15 for driving the first wheel 13 in rotation and a second electric motor 16 for driving the second wheel 14 in rotation. The first electric motor 15 and the second electric motor 16 may be synchronous motors with permanent magnets. The electric motors 15, 16 preferably have a large diameter and minimal thickness to favor torque generated at the rotation speed.

The first electric motor 15 comprises a stator 21 fixedly mounted on the casing 12 and a rotor 23 suitable for being driven in rotation relative to the stator 21 when the first motor 15 is fed with electric current.

Similarly, the second electric motor 16 comprises a stator 22 fixedly mounted on the casing 12 and a rotor 24 suitable for being driven in rotation relative to the stator 22 when the second motor 16 is fed with electric current.

The landing gear 2 further comprises a transmission mechanism 17 configured to transmit torques generated by the electric motors 15 and 16 selectively to the wheels 13 and 14 to drive the wheels in rotation, or to the second leg part 9 to drive the second leg part 9 in rotation relative to the first leg part 8.

The transmission mechanism 17 comprises a transmission shaft 30, a first reduction gear 25 and a second reduction gear 26.

The first reduction gear 25 is disposed between the first motor 15 and the first wheel 13. The first reduction gear 25 comprises an input shaft 31 attached to the rotor 23 of the first motor 15, a first output shaft 33 attached to the first wheel 13 and a second output shaft 35 suitable for meshing with the transmission shaft 30.

In the example illustrated in FIG. 3, the first reduction gear 25 is an epicyclic gear train comprising an inner sun gear 41, a planetary carrier 43, an outer ring gear 45 (or crown) and a plurality of planet gears 47. The inner sun gear 41 is fixed in rotation to the rotor 23 of the first motor 15 by means of the input shaft 31. The planetary carrier 43 is fixed in rotation to the first wheel 13 by means of the first output shaft 33 and the outer ring gear 45 meshes with the transmission shaft 30 by means of the second output shaft 35.

Similarly, the second reduction gear 26 is disposed between the second motor 16 and the second wheel 14. The second reduction gear 26 comprises an input shaft 32 connected to the rotor 24 of the second motor 16, a first output shaft 34 connected to the second wheel 14 and a second output shaft 36 suitable for meshing with the transmission shaft 30.

In the example illustrated in FIG. 3, the second reduction gear 26 is an epicyclic gear train comprising an inner sun gear 42, a planetary carrier 44, an outer ring gear 46 (or crown) and a plurality of planet gears 48. The inner sun gear 42 is fixed in rotation to the rotor 24 of the second motor 16 by means of the input shaft 32. The planetary carrier 44 is fixed in rotation to the second wheel 14 by means of the first output shaft 34 and the outer ring gear 46 meshes with the transmission shaft 30 by means of the second output shaft 36.

The transmission shaft 30 extends inside the leg 6. More precisely, the transmission shaft 30 extends inside the first leg part 8 and inside the second leg part 9.

The transmission shaft 30 comprises a first end 38 suitable for meshing with the output shafts 35 and 36 of the reduction gears 25 and 26, and a second end 39 suitable for meshing the support structure of the aircraft.

The first end 38 of the transmission shaft 30 comprises a bevel gear with teeth meshing with respective bevel gearings of the output shafts 35 and 36.

The second end 39 comprises a toothed wheel suitable for meshing with a toothed circular track 40 fixed on the support structure of the aircraft.

Also, the landing gear 2 comprises a first brake 51 arranged between the casing 12 and the first wheel 13. The first brake 51 is movable between an engaged configuration in which the brake 51 prevents rotation of the first wheel 13 relative to the casing 12 (and therefore to the second leg part 9), and a disengaged configuration in which the brake 51 enables rotation of the first wheel 13 relative to the casing 12 (and therefore to the second leg part 9).

Similarly, the landing gear comprises a second brake 52 arranged between the casing 12 and the second wheel 14. The second brake 52 is movable between an engaged configuration in which the brake 52 prevents rotation of the second wheel 14 relative to the casing 12 (and therefore to the second leg part 9), and a disengaged configuration in which the brake 52 enables rotation of the second wheel 14 relative to the casing 12 (and therefore to the second leg part 9).

The first brake 51 and the second brake 52 are for example multidisc brakes electrically actuated.

The landing gear 2 further comprises a third brake 53 arranged between the first leg part 8 and the second leg part 9. The third brake 53 is movable between an engaged configuration in which the third brake 53 prevents rotation of the second leg part 9 relative to the first leg part 8, and a disengaged configuration in which the third brake 53 enables rotation of the second leg part 9 relative to the first leg part 8.

Finally, the landing gear 2 comprises a fourth brake 54 arranged between the first leg part 8 and the second end 39 of the drive shaft. The fourth brake 54 is movable between an engaged configuration in which the fourth brake 54 prevents rotation of the transmission shaft 30 relative to the first leg part 9, and a disengaged configuration in which the fourth brake 54 enables rotation of the transmission shaft 30 relative to the first leg part 8.

The third brake 53 and the fourth brake 54 are for example clutch brakes for transmitting substantial torques but having reduce bulk.

Finally, the landing gear 2 comprises a fifth brake 55 arranged between the rotors 23 and 24 of the motors 15 and 16. The fifth brake 55 is movable between an engaged configuration in which the rotors 23 and 24 are fixed relative to each other, and a disengaged configuration in which the fifth brake 55 enables independent rotation of the rotors 23 and 24 of the motors 15 and 16.

In normal operation, the fifth brake 55 is in the disengaged configuration, enabling independent rotation of the rotors 23 and 24 of the motors 15 and 16.

In case of breakdown of one of the motors 15 or 16, the brake 55 may be engaged to connect the rotors 23 and 24 of the motors 15 and 16, ensuring rotation of the wheels 13 and 14 at the same speed.

In normal operation, the landing gear 2 may be controlled according to three main modes:

First Mode: Rolling and Braking on the Ground

According to a first mode of operation, the landing gear 2 is in the deployed position (position I), the third brake 53 and the fourth brake 54 are in engaged configurations.

In this mode of operation, the transmission shaft 30 is blocked relative to the first leg part 8 by the fourth brake 54.

In addition, the second leg part 9 is also blocked relative to the first leg part 8 by the third brake 53.

The first electric motor 15 and the second electric motor 16 are activated to drive the first wheel 13 and the second wheel 14 in rotation by means of the first reduction gear 25 and the second reduction gear 26.

This first mode of operation is used during rolling and braking phases on the ground. The electric motors 15 and 16 may be controlled at different speeds to let the aircraft 1 turn.

If needed, slowing of the aircraft 1 is ensured by engagement of the first brake 51 and the second brake 52. In the event where the electric motors 15 and 16 are reversible, it is also possible to ensure slowing of the aircraft by recovering of energy via the electric motors 15 and 16.

Second Mode: Deployment and Retraction of the Landing Gear

According to a second mode of operation, the first brake 51, the second brake 52 and the third brake 53 are in engaged configurations. The fourth brake 54 is in the disengaged configuration.

In this mode of operation, the wheels 13 and 14 are blocked relative to the second leg part 9. Also, the second leg part 9 is blocked relative to the first leg part 8.

The first electric motor 15 and the second electric motor 16 are activated in reverse direction. That is, the rotor 23 of the first motor 15 is driven in rotation relative to the stator 21 in a first direction of rotation, and the rotor 24 of the second motor 16 is driven in rotation relative to the stator 22 in a second direction of rotation, opposite the first direction.

The first electric motor 15 and the second electric motor 16 drive the two shafts 35 and 36 in rotation in opposite directions by means of the reduction gears 25 and 26.

Since the two shafts 35 and 36 are driven in rotation in opposite directions, the effect is that the transmission shaft 30 is driven in rotation relative to the first leg part 8.

Actually, output shafts 35, 36 and the transmission shaft 30 form in fact a differential suitable for driving the transmission shaft 30 in rotation relative to the leg 6 when the first electric motor and the second electric motor turn at different speeds.

The effect of rotation of the transmission shaft 30 is to have the end 39 of the transmission shaft 30 roll on the toothed circular track 40. Due to meshing of the transmission shaft 30 with the toothed circular track, the landing gear 1 is driven in rotation relative to the support structure of the aircraft about the axis X by means of the articulation 10.

The landing gear 2 is driven in rotation relative to the support structure of the aircraft between the deployed position (position I) and the retracted position (position II). The direction of rotation of the landing gear 2 depends on the directions of rotation of the electric motors 15 and 16.

The landing gear 2 may be selectively deployed or retracted by reversing the directions of rotation of the electric motors 15 and 16.

Third Mode: Orientation of the Landing Gear

According to a third mode of operation, the first brake 51, the second brake 52 and the fourth brake 54 are in engaged configurations. The third brake 53 is in the disengaged configuration.

In this mode of operation, the wheels 13 and 14 are blocked relative to the second leg part 9. Also, the transmission shaft 30 is blocked relative to the first leg part 8 by the fourth brake 54.

The first electric motor 15 and the second electric motor 16 are activated in reverse directions. That is, the rotor 23 of the first motor 15 is driven in rotation relative to the stator 21 in a first direction of rotation, and the rotor 24 of the second motor 16 is driven in rotation relative to the stator 22 in a second direction of rotation, opposite the first direction.

The first electric motor 15 and the second electric motor 16 drive the two shafts 35 and 36 in rotation in opposite directions by means of the reduction gears 25 and 26.

Since the transmission shaft 30 is blocked in rotation relative to the first leg part 8, the effect is that the second leg part 9 and the wheel train 7 are driven in rotation relative to the first leg part 8 about the axis Y.

Rotation of the second leg part 9 relative to the first leg part 8 enables adjustment of the orientation of the faired portion 11 to produce a lift force acting on the faired portion 11.

The faired portion 11 may be oriented to facilitate easy retraction of the landing gear 2.

The angular position of the faired portion is adjusted to produce a lift force favorable to raising the landing gear 2. Once the angular position is reached, the third brake 53 is engaged and the fourth brake 54 is disengaged to enable retraction of the landing gear 2 (second mode of operation).

This mode of operation may also be used to steer the aircraft 1 on the ground during taxiing and parking phases.

The invention claimed is:

1. A landing gear for an aircraft comprising:
    a leg having a longitudinal axis (Y) and comprising a first leg part suitable for being articulated on a support structure of the aircraft for deployment and retraction of the landing gear, and a second leg part movably mounted in rotation relative to the first leg part along the longitudinal axis (Y) of the leg,
    a wheel rotatably mounted in rotation relative to the second leg part and an electric motor suitable for driving the wheel in rotation relative to the second leg part,
    a transmission mechanism configured to selectively transmit torque generated by the electric motor to one of the wheel to drive the wheel in rotation relative to the second leg part, and the second leg part to drive the second leg part in rotation relative to the first leg part along the longitudinal axis (Y) of the leg.

2. The landing gear according to claim 1, wherein the transmission mechanism comprises a transmission shaft, having a first end suitable for being coupled to the motor and a second end suitable for being immobilized relative to the first leg part to drive the second leg part in rotation relative to the first leg part.

3. The landing gear according to claim 2, wherein the transmission shaft extends inside the leg.

4. The landing gear according to claim 2, wherein the transmission shaft is rotatably mounted relative to the second leg part about the longitudinal axis (Y) of the leg.

5. The landing gear according to claim 2, further comprising a brake arranged between the first leg part and the second end of the transmission shaft, the brake being movable between an engaged configuration in which the brake prevents rotation of the transmission shaft relative to the first leg part, and a disengaged configuration in which the brake enables rotation of the transmission shaft relative to the first leg part.

6. The landing gear according to claim 2, comprising a toothed wheel fixedly mounted on the second end of the transmission shaft, the toothed wheel being suitable for meshing with a toothed circular track fixedly mounted on the support structure of the aircraft, such that rotation of the transmission shaft relative to the first leg part causes rotation of the landing gear relative to the support structure of the aircraft.

7. The landing gear according to claim 2, wherein the transmission mechanism comprises a reduction gear having an input, a first output and a second output, the input being connected to the electric motor, the first output being connected to the wheel so that the motor may drive the wheel by means of the reduction gear, and the second output being connected to the transmission shaft so that the electric motor may drive the transmission shaft in rotation relative to the second leg part by means of the reduction gear.

8. The landing gear according to claim 1, further comprising a brake arranged between the first leg part and the second leg part, the brake being movable between an engaged configuration in which the brake prevents rotation of the second leg part relative to the first leg part, and a disengaged configuration in which the brake enables rotation of the second leg part relative to the first leg part.

9. The landing gear according to claim 1, wherein the second leg part comprises a faired portion, the rotation of the second leg part relative to the first leg part enabling adjustment of the orientation of the faired portion to produce a lift force acting on the faired portion, for facilitating retraction of the landing gear.

10. The landing gear according to claim 1, comprising a brake arranged between the second leg part and the wheel, the brake being movable between an engaged configuration in which the brake prevents rotation of the wheel relative to the second leg part, and a disengaged configuration in which the brake enables rotation of the wheel relative to the second leg part (9).

11. The landing gear according to claim 1, comprising a first wheel and a second wheel, a first electric motor and a second electric motor suitable for driving respectively the first wheel and the second wheel in rotation relative to the second leg part, to enable rolling of the aircraft.

12. The landing gear according to claim 11, wherein the transmission mechanism comprises:
    a transmission shaft, the transmission shaft being rotatably mounted relative to the second leg part about the longitudinal axis (Y) of the leg, and
    a first reduction gear comprising an input connected to the first electric motor and an output connected to the transmission shaft, and
    a second reduction gear comprising an input connected to the second electric motor and an output connected to the transmission shaft,
    the first reduction gear and the second reduction gear forming a differential suitable for driving the transmission shaft in rotation when the first electric motor and the second electric motor turn at different speeds.

13. The landing gear according to claim 12, comprising a first brake arranged between the second leg part and the first wheel and a second brake arranged between the second leg part and the second wheel, each brake being movable between an engaged configuration in which the brake prevents rotation of the wheel relative to the second leg part and a disengaged position in which the brake enables rotation of the wheel relative to the second leg part.

\* \* \* \* \*